Sept. 7, 1954 Q. BERG 2,688,133
APPLICATOR FOR CONNECTORS AND THE LIKE
Filed Dec. 29, 1950 12 Sheets-Sheet 1

INVENTOR
Quentin Berg
BY
Curtis, Morris & Safford
ATTORNEYS

Sept. 7, 1954 Q. BERG 2,688,133
APPLICATOR FOR CONNECTORS AND THE LIKE
Filed Dec. 29, 1950 12 Sheets-Sheet 5

INVENTOR
Quentin Berg
BY
Curtis, Morris & Safford
ATTORNEYS

Sept. 7, 1954 Q. BERG 2,688,133
APPLICATOR FOR CONNECTORS AND THE LIKE
Filed Dec. 29, 1950 12 Sheets-Sheet 7

INVENTOR
Quentin Berg
BY
Curtis, Morris + Safford
ATTORNEYS

INVENTOR
*Quentin Berg*
BY
*Curtis, Morris + Safford*
ATTORNEYS

Sept. 7, 1954 Q. BERG 2,688,133
APPLICATOR FOR CONNECTORS AND THE LIKE
Filed Dec. 29, 1950 12 Sheets-Sheet 10

Sept. 7, 1954 Q. BERG 2,688,133
APPLICATOR FOR CONNECTORS AND THE LIKE
Filed Dec. 29, 1950 12 Sheets-Sheet 11

INVENTOR
*Quentin Berg*
BY
*Curtis, Morris & Safford*
ATTORNEYS

Sept. 7, 1954 Q. BERG 2,688,133
APPLICATOR FOR CONNECTORS AND THE LIKE
Filed Dec. 29, 1950 12 Sheets-Sheet 12

INVENTOR
Quentin Berg
BY
Curtis, Morris & Safford
ATTORNEYS

Patented Sept. 7, 1954

2,688,133

UNITED STATES PATENT OFFICE 2,688,133

APPLICATOR FOR CONNECTORS
AND THE LIKE

Quentin Berg, New Cumberland, Pa., assignor to
Aircraft-Marine Products Inc., Harrisburg, Pa.

Application December 29, 1950, Serial No. 203,305

14 Claims. (Cl. 1—165)

This invention relates to machines for applying connectors to the ends of wire leads and more particularly to a machine for automatically bringing a lead into position to have connectors applied thereto and then automatically effecting the application of the connectors to the two ends of the lead. Although the embodiment of the invention herein shown and described is designed for the application of plug-in connectors to wire leads, particularly plug-in connectors of the smaller or pin type sizes, it will be understood that the invention is equally adaptable to machines for applying other types of connectors.

In my copending application Serial No. 151,795, filed March 24, 1950, I have shown a machine for feeding connectors of the plug-in type successively into position to receive the end of a lead upon which the connector is to be crimped, this lead end being manually placed in position for the crimping operation and the connectors being provided in the form of strips having the pin end of one connector connected to the ferrule end of the next. The machine of my copending application, which requires the manual placing of the insulated lead wire in position to have the ferrule end of the connector crimped thereupon, operates on one end only of the wire lead at a time. The present invention aims to provide a machine in which not only is the lead wire brought automatically into position to have the connectors crimped thereupon but in which connector feeding means and connector crimping means are so arranged that a connector is automatically crimped upon each end of the lead, these crimping operations preferably taking place simultaneusly.

Since wire leads for effecting electrical connections between various parts of electrically operated machinery are necessarily of a wide variety of lengths, it is important that a machine which is to apply connectors simultaneously to both ends of a wire lead be readily adaptable to use with leads of various lengths. An important object of the present invention, therefore, is to provide a connector applying machine for simultaneously applying connectors to the two ends of wire leads which is readily adjustable to adapt it for use with leads of a considerable range of lengths.

Wire leads are usually made of comparatively flexible insulated wire and, therefore, the positioning of the ends of the lead wire for the reception of the connectors requires the guiding of the wire near such connector receiving ends. An important feature of the invention is the novel means for thus holding the wire for the connector-applying operation and the novel provision for adjustment of such means to adapt them for leads of various lengths.

Another important feature of the invention is the provision of a carrier into which wire-feeding means may feed a lead of substantially the desired length from a coil of lead wire, cutting means being so arranged in respect to the carrier that the required length of lead wire will be provided with connector-receiving ends projecting substantially equally from the two sides of the carrier into position to receive the connectors.

Still another important feature of the invention is the provision of wire-guiding means between pairs of wire grippers or clamps on the lead carrier, which means operate only during the wire feeding operation and open to permit travel of the lead with the carrier when the lead has been cut to the desired length.

In the connector-applying machine of the present invention which receives a suitable lead length of wire in a carrier in one position of the carrier and then effects a movement of the carrier to bring the lead length into the connector-applying position, it is important that the wire end be brought over the open side of the connector ferrule and moved into this ferrule before the ferrule is crimped in order to be sure that the ferrule is crimped upon the wire. Important features of the invention therefore are the means employed, in a machine in which the lead wire is brought into connector-applying position by a carrier movement transverse to the feeding movement of the connector, for preventing interference between the connector and the lead wire during this movement of the carrier and for insuring the centering of the lead wire end over the open side of the ferrule before the crimping operation.

Other important features, objects and advantages of the present invention, to which reference has not specifically been made hereinabove, will appear hereinafter when the following description and claims are considered in connection with the accompanying drawings, in which—

In the illustrative embodiment of the invention the mechanism for driving the various elements of the machine from connections to a motor 2 and a reduction gearing 4, the output shaft of which is provided with a driving sprocket 6, is mounted upon a base member 8 which is preferably locked in a fixed position on a lathe-type bed 9 so that the sprocket wheel 10, mounted to turn freely on the main shaft 12 of the machine, will be maintained in alignment with the sprocket wheel 6 and can be driven therefrom by a sprocket chain 14.

The shaft 12 has three main bearings, two of which are fixed and the third of which is adjustable along the bed 9 together with the operating element of the applicator mechanism associated therewith. One of the fixed bearings is in a crossbar 16 fixed to vertical posts 18 and 20 (Figs. 1, 2, 4, 15) attached to the base 8, these posts being preferably cylindrical and serving as guides for a movable crossbar or ram 22 supported on springs 24 and 26 surrounding the posts 18 and 20. The springs 24 and 26 are tensioned to hold a cam follower 28 carried by the movable ram 22 against a cam 30 keyed to the main shaft 12. Depending sleeves 27 attached to the ram 22 serve to hold the springs 24 and 26, which are of considerably larger diameter than the posts 18 and 20, in concentric relation to said posts.

Figure 9:
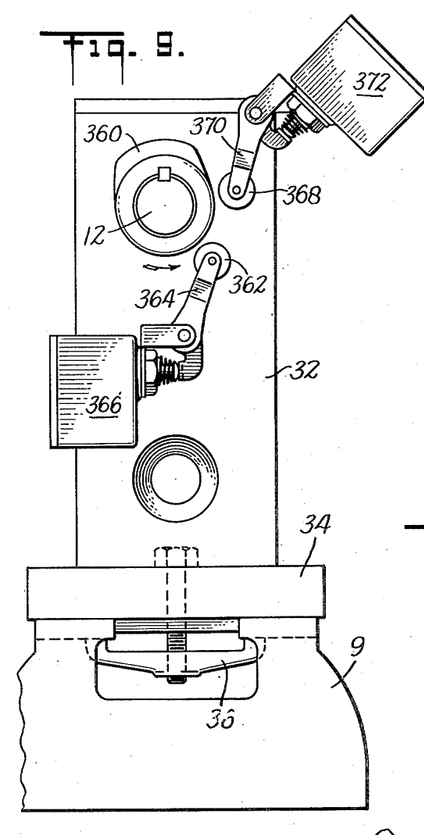
Figure 9 is a section on the line 9—9 of Fig. 1.

The other fixed bearing for the shaft 12 is in an upright 32 affixed to a base 34 clamped in its normally fixed position on the lathe-like bed 9 by a C-clamp 36 shown in Fig. 9. Similar C clamps secure in position on the bed 9 both the other base member 8 carrying the other fixed bearing and the base member 38 carrying the adjustable bearing hereinafter to be described. The shaft 12 is preferably of considerable length to permit the movement of the base member 38 and the mechanism carried thereby on the lathe-like bed 9 over a considerable range to provide for operation on a considerable range of lengths of leads.

Figure 11:
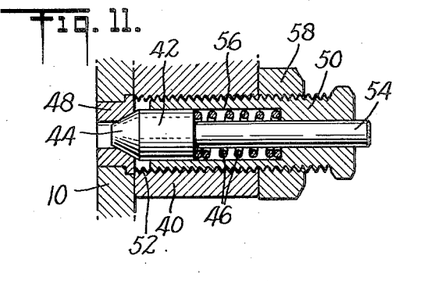
Figure 11 is a section on the line 11—11 of Fig. 5.
Figure 12:
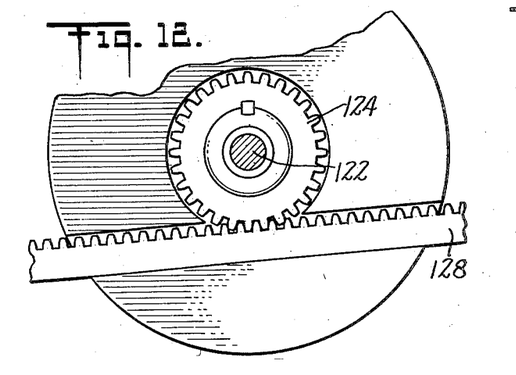
Figure 12 is a section on the line 12—12 of Fig. 4.

As above stated, the sprocket wheel 10 is mounted on the shaft 12 to turn freely thereon but has a driving connection thereto through an overload release connection now to be described. The part of the shaft 12 upon which the sprocket wheel 10 is mounted is preferably of somewhat reduced diameter. Also mounted upon this reduced part of the shaft but fixed thereto is a crank arm 40 (Figs. 1, 2 and 5) which is provided with a spring-pressed detent (Fig. 11) in the form of a plunger 42 having a conical end 44 pressed by the spring 46 into a hardened conical seat 48 in the sprocket wheel 10. The spring 46 and plunger 42 are carried in a socket member 50 screwed into an opening 52 tapped into the arm 40. A stem 54 on the plunger 42 extends through the bottom of the socket 56 in the socket member 50 and a lock nut 58 threaded upon the outside of the socket member 50 serves to lock the socket in different spring tensioning adjustments in the arm 40 whereby the resistance to turning required to release the safety mechanism can readily be adjusted.

Referring to the various mechanisms operated directly or indirectly from the main driving shaft 12, there is provided a carrier for the lead wires to be provided with connectors which is preferably in the form of two octagonally shaped rotary members 60 and 62 mounted to turn freely on the shaft 12 but connected by spacer rods 64 which, as herein shown, have reduced threaded ends tapped into the right hand rotary member 60 and reduced unthreaded ends extending through openings in the left hand rotary member 62 and secured in said left hand member by headed machine screws 66 tapped into the ends of the rods 64. The length of the rods 64 is chosen for the particular length of lead to be operated upon. If a shorter lead is to be operated upon by the machine, shorter rods 64 are substituted for those shown and correspondingly if a longer lead is to be operated upon longer rods are used, the base 38 being unclamped from the lathe bed 9 and moved along the shaft 12 to adapt the apparatus for the different lengths of rods 64 and the operation upon leads of different lengths.

As above stated, the rotary members 60 and 62 are octagonal in shape and are so connected that the flat edges of the two members are parallel. Mounted upon each of these opposed parallel flat edges is a wire gripper or clamp comprising a base 68 having thereon two uprights 70 and 72, these and the other parts of the clamp being shown in considerable detail in Fig. 7 of the drawings which also shows the right hand octagonal rotary member 60 in side elevation.

Figure 14:
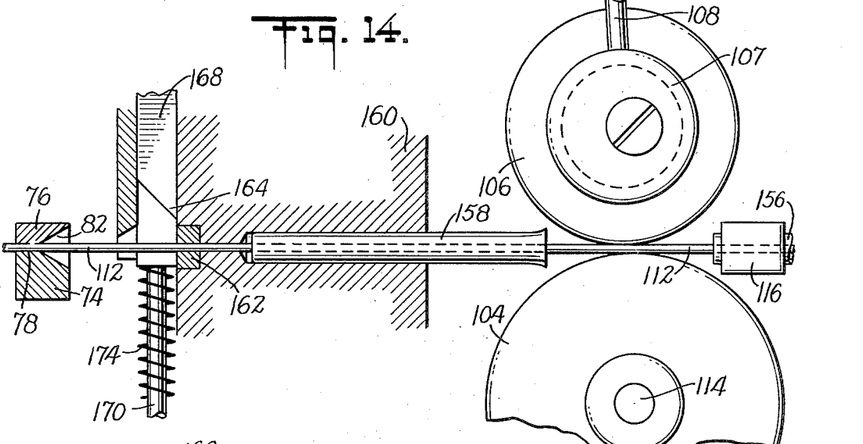
Figure 14 is a section on the line 14—14 of Fig. 2.

The upright 70 has an offset portion 74 constituting one-half of the wire clamp and provided with a semi-cylindrical wire guide. Cooperating with this stationary clamp member is a pivoted clamp member 76 also provided with a semi-circular groove constituting the other half of the wire guide 78. The movable clamp member 76 is held yieldingly against the offset 74 by a spring 80, strong enough to hold the lead in position for movement between the feeding and connector applying positions of the carrier but preferably not too strong to permit ready feeding of the wire into the clamp and across the intervening space between the rotary member 60 and the rotary member 62 to the clamp on the latter rotary member in line with the first mentioned clamp. On the side of each clamp into which the lead wires is first introduced the clamp members 74 and 76 have formed therein a funnel-like recess 82 tapering to the wire guide 78 and serving to guide the wire which is fed by the wire feeding means into the wire guide 78 between the clamp members 74 and 76; see Fig. 14 of the drawings.

The carrier, made up of the members 60, 62 and the connecting rods 64, is indexed in a step-by-step manner about the shaft 12 to bring the wire clamps first into wire-receiving position and then into connector applying position and then into lead discharge position. As herein shown (Fig. 7) this indexing is effected by a Geneva stop mechanism which provides for a rest in each position and which comprises a rotary disc 84 mounted on a short shaft 86 and having an arm 87 carrying a pin 88 adapted to enter successively slots 90 in a disc 92 attached to the right hand octagonal rotary member 60 of the carrier. There are eight of the slots 90, one corresponding to each clamp-carrying side of the octagonal carrier, so that each rotation of the shaft 86 causes the pin 88 to engage a slot 90 and turn the carrier one-eighth of a rotation about the axis of the shaft 12.

Figure 2:
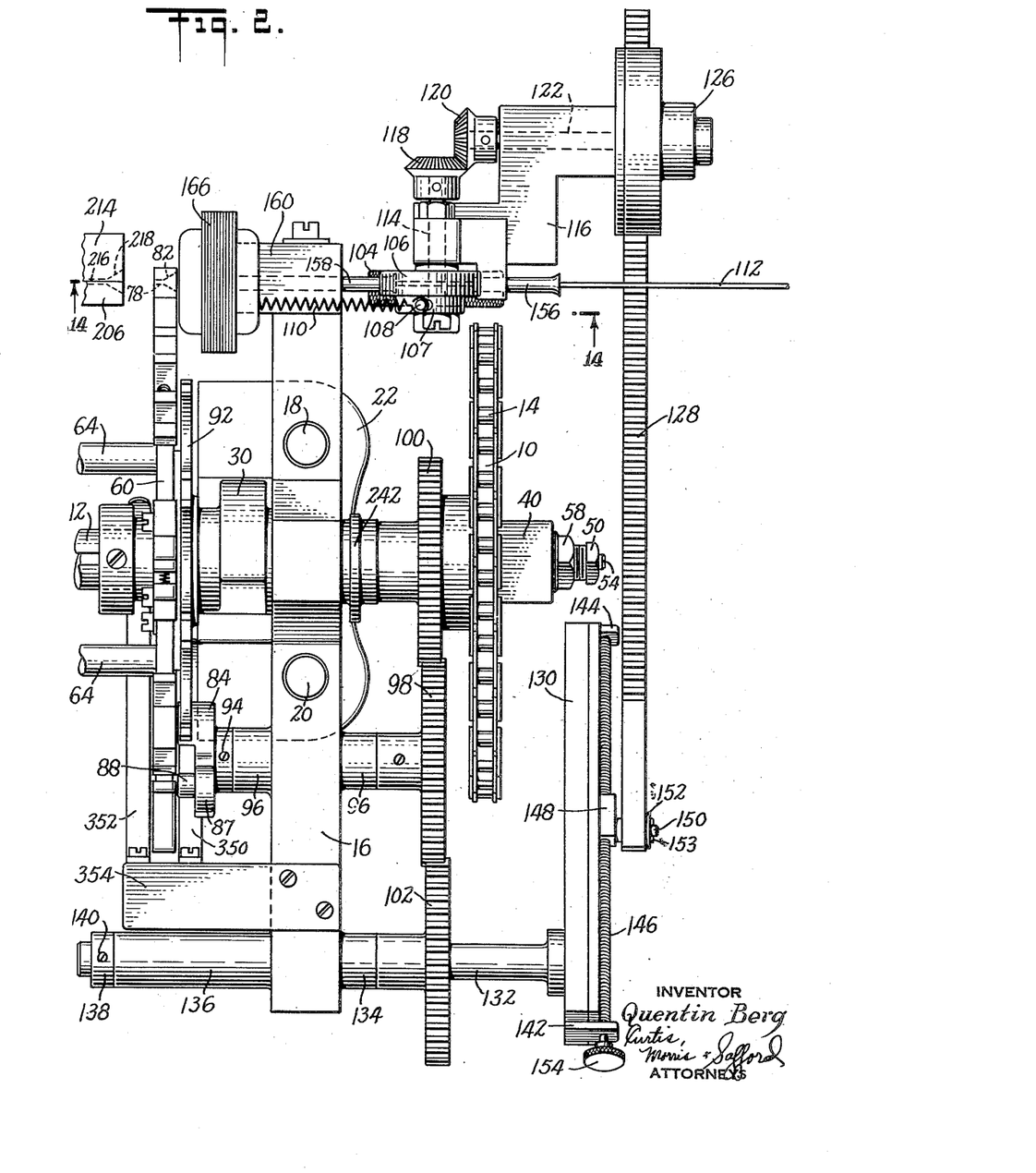
Figure 2 is an enlarged plan view of the right hand part of the applicator mechanism of the machine, showing particularly the driving connections, the wire feeding mechanism, etc.

As shown in Fig. 2 of the drawings, the shaft 86 has the disc 84 mounted on one end thereof and secured thereon by a set screw 94 in the hub of the disc 84. The shaft 86 has its bearings in bosses 96 on the two sides of the stationary cross piece 16 and at its other end carries the intermediate gear 98 of three gears 98, 100, 102 of equal diameter so that each gear makes one complete rotation for each rotation of the main shaft 12, the gear 100 being fixed upon the main shaft 12 to turn therewith. It will be seen, therefore, that the carrier for the lead wires is indexed one-eighth of a rotation for each rotation of the shaft 12.

Figure 13:
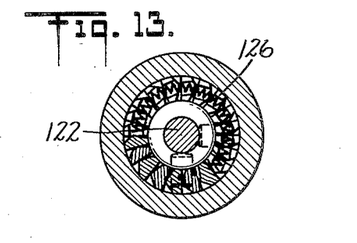
Figure 13 is a section on the line 13—13 of Fig. 4.

The wire is fed into the carrier from the right hand side and wire-feeding mechanism is provided having a considerable range of adjustment to adapt it for feeding a considerable range of lengths of leads into the applicator mechanism. The illustrated wire feeding mechanism (Figs. 2, 4 and 14) comprises a lower feeding wheel 104 and an upper idler or presser wheel 106 on an eccentrically mounted ball bearing 107 permitting the idler wheel 106 to be rocked by an arm 108, to which a spring 110 is attached toward the feeding wheel 104 and thus into gripping relation with the wire 112. The wire feeding wheel 104 is attached to a shaft 114 mounted in a bracket 116. The shaft 114 carries at its outer end a bevel gear 118 meshing with a bevel gear 120 on another short shaft 122 between which and a rack gear 124 there is an over-running clutch 126 which may be, for example, of the type shown in Fig. 13. This clutch is arranged to cause the rack gear 124 to turn the shaft 122 on the forward movement of the rack bar 128 and to permit the rack gear 124 to rotate idly on the return movement of the rack bar 128.

Figures 5, 6:
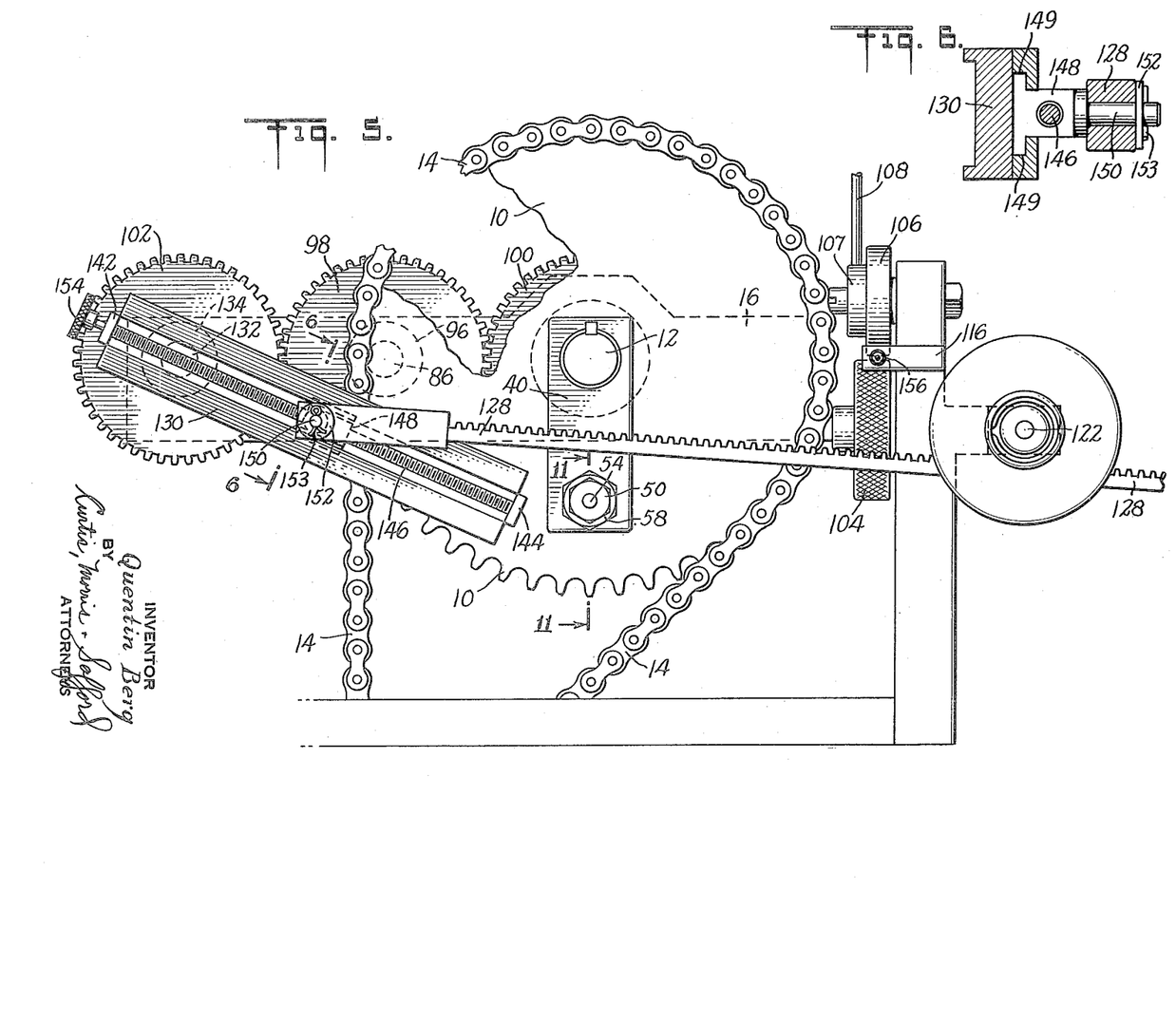
Figure 5 is a section on the line 5—5 of Fig. 1.
Figure 6 is a section on the line 6—6 of Fig. 5.

The rack bar 128 has an adjustable connection to a crank arm 130 (Figs. 2 and 5) on the outer end of a shaft 132 to which the gear 102 is connected. It will be seen that the shaft 132 has a long bearing in bosses 134 and 136 connected to the side faces of the crossbar 16 and that the shaft is secured in its bearings by a collar 138 secured to the shaft by a set screw 140. The crank arm 130 has two lugs 142 and 144 in which a lead screw 146 has its bearings, this lead screw being threaded through a block 148 sliding in a guideway 149 on the arm 130 (see Fig. 6) and having thereon a crank pin 150 on which the end of the rack bar 128 remote from the rack gear 124 is pivotally mounted, being secured upon the shouldered pin 150 by a washer 152 and cotter pin 153 (Fig. 6). A knob 154 on the lead screw 146 may be used to turn it to effect an adjustment of the length of the crank arm effecting the reciprocating movement of the rack bar 128, thus effecting an adjustment in the length of lead wire fed at one stroke.

As above stated, the gear 102 is of the same diameter as the gear 98 and also the gear 100 so that the crank arm 130 makes a complete rotation for each rotation of the main shaft 12 and thus effects a complete reciprocation of the rack bar 128.

Figure 4:
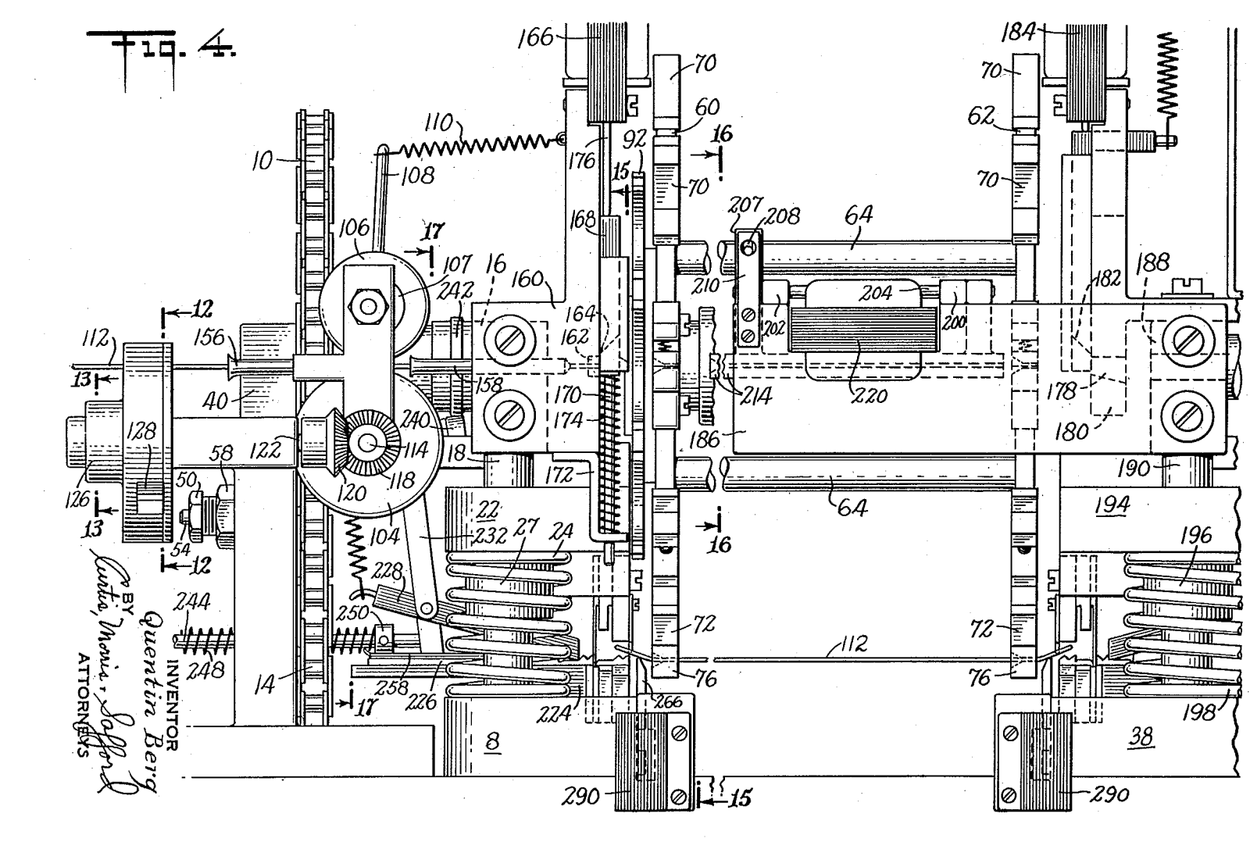
Figure 4 is a rear view of the applicator mechanism of the machine.

Referring to Figure 4, the wire 112 to be fed to form a lead is guided into the feeding mechanism, comprising the lower and upper wheels 104 and 106, through a tube 156 having a bell mouth to facilitate inserting the wire thereinto. From the feeding wheels the wire passes into a second bell-mouthed tube 158 which guides it into a guide block 160 attached to the rear end of the crossbar 16. A small block of hardened material, such as Carboloy, 162 is inserted in the block 160 at the outlet end of the wire guide therein to provide a cutting edge which cooperates with a knife 164 operated by a solenoid 166, as hereinafter more fully described. The knife 164 is carried on a slide 168 having a rod 170 extending from its lower end and guided in an opening in a bracket 172, a spring 174 tending normally to maintain the slide 168 and knife 164 in their uppermost positions. The solenoid core 176 bears on the upper end of the slide 168 and is so located in the solenoid coil that when the solenoid is energized it operates to push the knife 164 down against the action of the spring 174 and cause the wire projecting through the hardened block 162 to be sheared off against the edge of the opening in said block.

The setting of the rack 128 on the crank arm 130 should be such that a length of wire at least long enough to project across the carrier and, when cut, leave a projecting end, on each side of the carrier, sufficient to receive a connector or ferrule. Preferably the wire is slightly overfed and solenoid operating cutting means provided for cutting off each end to the desired length of projection. To this end the wire, after passing through the clamp on the octagonal clamp carrier remote from the one into which it first enters is introduced into an opening 178 in a block 180. Over the edge of the opening 178 a knife 182 is operated by a solenoid 184 to trim off the excess wire projection brought about by the overfeeding, the wire cutter construction being substantially the same as that described in connection with the cutting mechanism shown at the left hand side of the rear view of the machine in Fig. 4 which serves to cut the wire from the supply.

Since the wire employed in leads, usually insulated copper wire, is comparatively soft and flexible, guiding means are employed to guide the wire between the two clamps from the outer sides of which it projects to receive the connectors. This guiding means is so constructed that it operates only temporarily and thus does not interfere with the movement of the carrier between the wire lead receiving position and the connector applying position. As shown particularly in Figs. 3 and 4, the wire guide, which serves to guide the wire as it is fed across the carrier from one clamp to the opposite cooperating clamp, is mounted on a plate or arm 186 attached to the rear face of the crossbar 188 in which is located the adjustable bearing for the main shaft 12. This crossbar 188 is fixed on vertical rods 190 and 192 extending up from the base 38, the rods 190 and 192 being similar to the rods 18 and 20 hereinabove described and having mounted thereon a movable crossbar or ram 194 similar to the movable ram 22 hereinabove described. The ram 194 is provided with depending sleeves 196 for holding springs 198 concentric with the rods 190 and 192, these sleeves being similar to the sleeves 27 hereinabove described.

Figure 3:
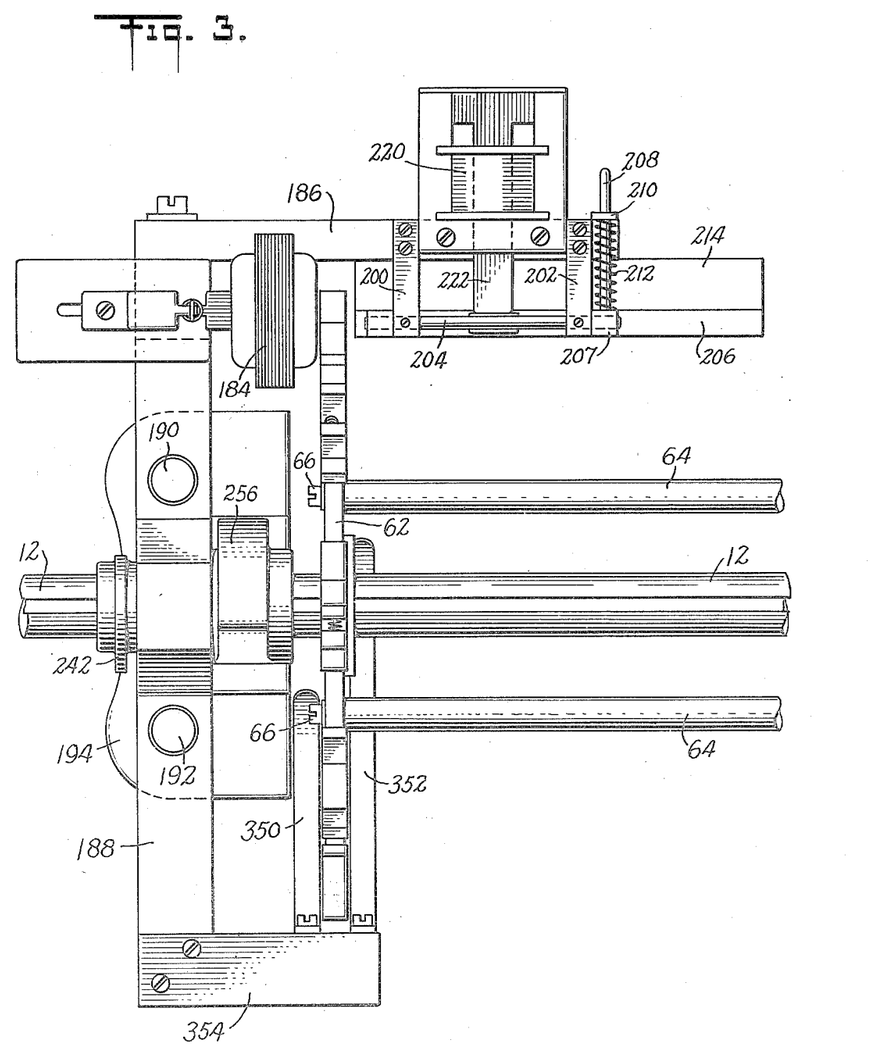
Figure 3 is an enlarged plan view of the left hand part of the applicator mechanism of the machine, this view and Figure 2 being so scaled that the two views may be placed side by side to form an assembly plan view of the principal functional parts of the machine.
Figure 16:
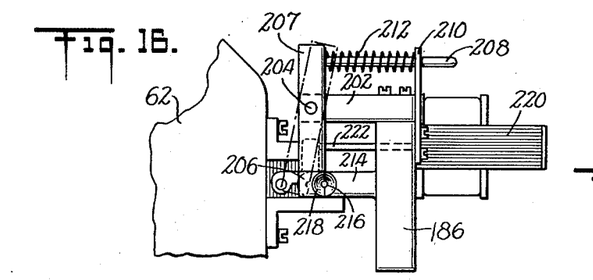
Figure 16 is a section on the line 16—16 of Fig. 4.

As is seen in Figs. 3, 4 and 16, the plate or bar 186 has bracket arms 200 and 202 which extend toward the shaft 12 from the plate 186 and carry a pivot shaft 204 on which swings one member 206 of a wire guide extending across the carrier substantially from one octagonal side member to the other. It will be noted that the movable member 206 of the wire guide is suspended on short arms from the pivot shaft 204 and that one of these arms projects above the pivot shaft 204 sufficiently to provide a lever arm which has connected thereto a rod or link 208 guided through an opening in an upright 210 attached to the rear of the plate 186. A spring 212 surrounding the rod 208 bears against the lever arm 207 and tends to hold the movable member of the wire guide in its closed relation to the stationary member 214.

It will be seen (Fig. 16) that the wire guide is provided with a guide opening 216, one-half of which is in the movable member 206 and the other half of which is in the stationary member 214 and that at the end of the wire guide into which the wire is first introduced there is a funnel-shaped mouth 218 for guiding the wire into the guide opening proper 216.

When the wire has been fully fed and the carrier is ready to carry the prepared lead into position to receive the connectors, the wire guide is opened automatically, the illustrative means comprising a solenoid 220 having its movable core 222 connected to the movable guide member 206, as shown, so that when the solenoid 220 is energized the core 222 will push the movable member 206 away from the stationary guide member 214 and thus open the wire guide to permit the wire to be carried along with the carrier to the connector receiving position.

Figure 17:
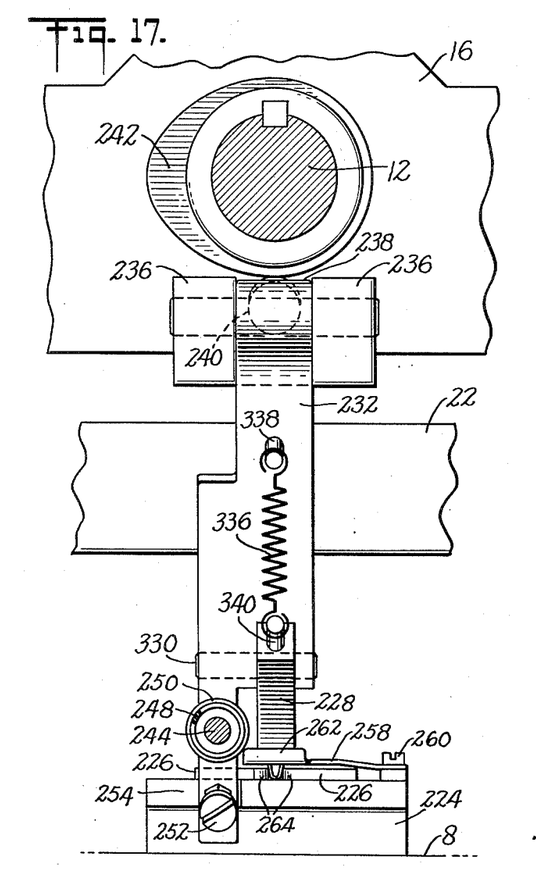
Figure 17 is a section on the line 17—17 of Fig. 4.
Figure 18:
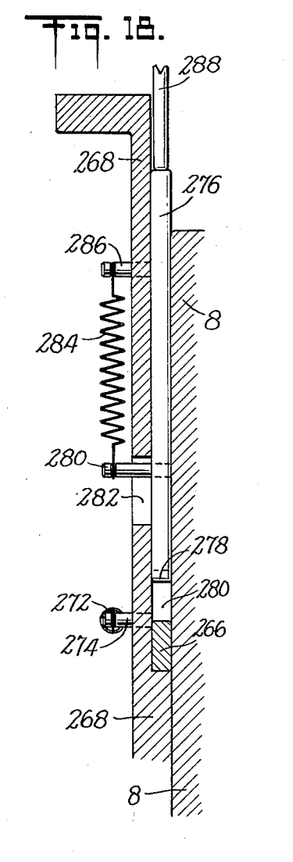
Figure 18 is a section on the line 18—18 of Fig. 15.

As the carrier is indexed by the Geneva stop movement, hereinabove described, to bring wire clamps from their lead wire receiving position to the position in which the connectors are applied to the projecting ends of the lead wire, a connector is fed into position on each side of the carrier to be crimped on the projecting end of the lead wire. The illustrative means for feeding the connectors into position to receive the wire ends comprise a guideway or runway for a strip of connectors having open-sided insulation piercing ferrules and pin ends, the pin of one connector being connected to the ferrule of the next connector by a short strip which is cut out at the time the connector is severed from the strip of connectors. The feeding mechanism is illustrated in detail in Fig. 19 and the guideway for the connectors is shown as formed on the upper face of a block or bracket 224 which may be secured to the base 8. The guideway may be formed as shown by strips or plates 226 fastened in spaced relation upon the upper face of the bracket 224. A feed pawl 228, shaped to engage the connectors behind their upturned uncrimped ferrule sides, is pivotally connected at 230 to the long arm 232 of a bellcrank lever fulcrumed at 234 between ears 236 projecting from the side of the fixed crossbar 16 (Fig. 17), the short arm 238 of the bellcrank carrying a roller 240 engaged by a cam 242 on the main shaft 12 of the machine.

Figure 1:
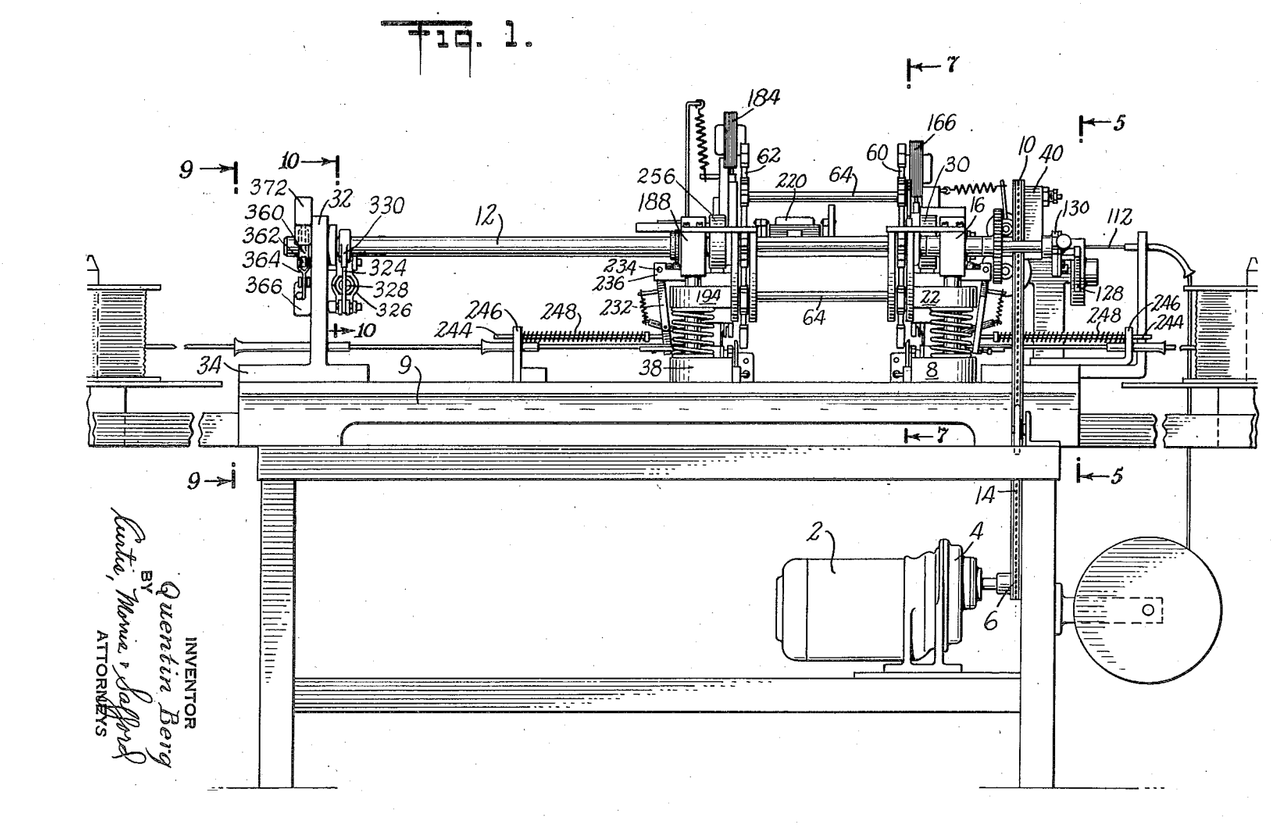
Figure 1 is a front elevation of a connector applying machine embodying the present invention.

The action of the cam 242 effects a positive rocking of the bellcrank lever, on which the feed pawl 228 is pivoted, in a direction away from the feeding direction. The movement of the bellcrank in the feeding direction, which insures that the roller 240 will follow the cam so far as possible, is brought about by a rod 244 also preferably pivotally connected to the bellcrank lever at one end and guided through an opening in a bracket 246 at its other end (Fig. 1). A spring 248, confined between a collar 250 fixed upon the rod and the bracket 246, urges the bellcrank arm 232 toward the forward limit of its feeding movement. The forward limit of the feeding movement of the bellcrank 232 and accordingly of the pawl 228 is adjustably limited by a stop screw 252 threaded through the lower end of the bellcrank arm 232 and engaging the fixed stop 254 on the block or bracket 224.

It will be seen that by adjusting the stop screw 252 in the arm 232 different effective feeding strokes of the pawl 228 may be obtained. There is a strip feeding mechanism of the character just described on each side of the carrier and the corresponding reference numerals will be used to apply to each of these mechanisms so far as is possible.

As above stated, a connector is fed into position to receive the projecting end of the lead wire in its open-sided ferrule when the carrier is indexed to bring a set of wire clamps from their wire-receiving position to their connector-applying position and, as the wire comes into position over the open-sided ferrule, the cam 30 on the main shaft 12 acts on the cam follower 28 on the ram 22 to drive it downward and effect the crimping of the ferrule upon the wire and the severing of the connector from the strip of connectors, the latter operation being followed by a wiping of any burr left upon the end of the pin into the rounded end of the pin. The crimping, cutting and wiping operations are performed simultaneously upon the two sides of the carrier, the shaft 12 having a cam 256 similar to the cam 30 which operates to depress the other ram 194 carrying the upper parts of similar cutting, crimping and wiping mechanisms. So far as is possible like reference numerals will be applied to the cutting, crimping and wiping parts on the two sides of the machine.

It should here be pointed out that, to insure the presentation of the connectors to the crimping mechanism in upright condition and at the same time to prevent the connector strip from being moved backward on the non-feeding stroke of the pawl 228, a spring plate 258, anchored by screws 260 upon the block or bracket 224, projects over the guideway for the connector strip and presses upon the upper edges of the ferrule sides to maintain them in horizontal parallelism and at the same time to furnish friction to prevent backward movement on the non-feeding stroke of the pawl 228. To facilitate movement of the connector strip into the guideway the spring plate 258 is provided with an upturned lip 262 at the intake end of the connector guideway. It will also be noted that the guideway defining plates 226 are rounded off, as shown at 264, at the guideway entrance.

As the Geneva stop mechanism is operated to index the carrier, moving lead wire clamps between their wire receiving position and their connector applying position, the connectors, as above stated, are fed into position to receive the projecting ends of the wire leads preparatory to being crimped thereupon. To prevent interference between these projecting lead ends and the connectors as they are brought into operative relation to each other, the lead ends are preferably lifted slightly so that they may pass over the open side edges of the connectors as they are moved into position over these open sides. To this end a wire locater 266 is provided which normally projects into the path of travel of the projecting end of the lead, there being one of these locaters on each side of the lead carrier.

Figure 15:
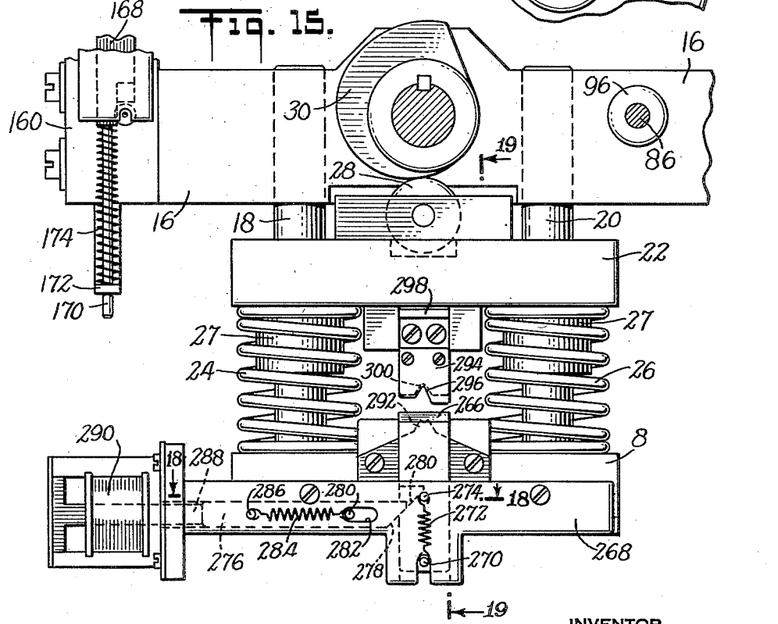
Figure 15 is a section on the line 15—15 of Fig. 4.
Figures 19, 20:
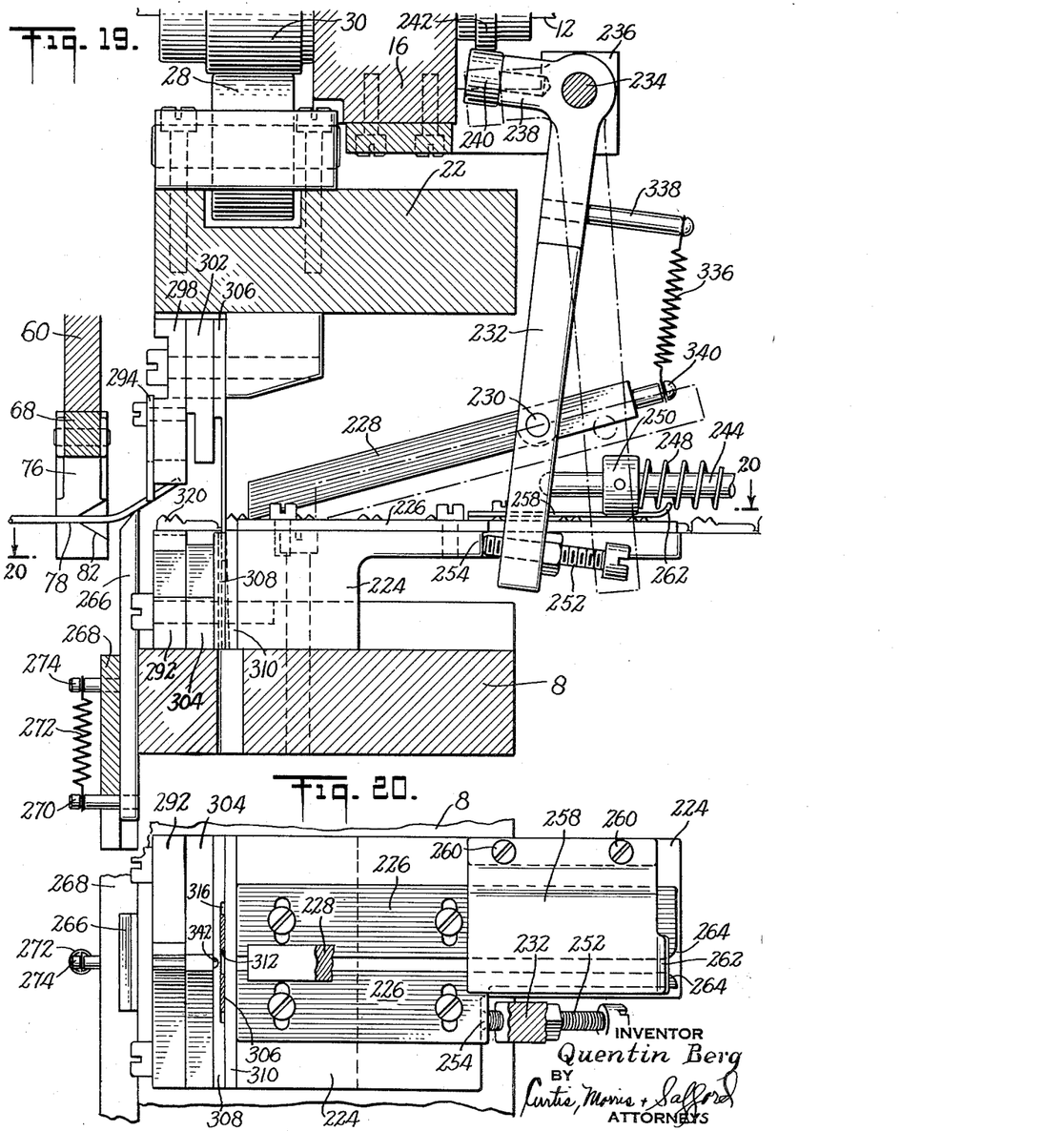
Figure 19 is a section on the line 19—19 of Fig. 15.
Figure 20 is a section on the line 20—20 of Fig. 19.
Figure 22:
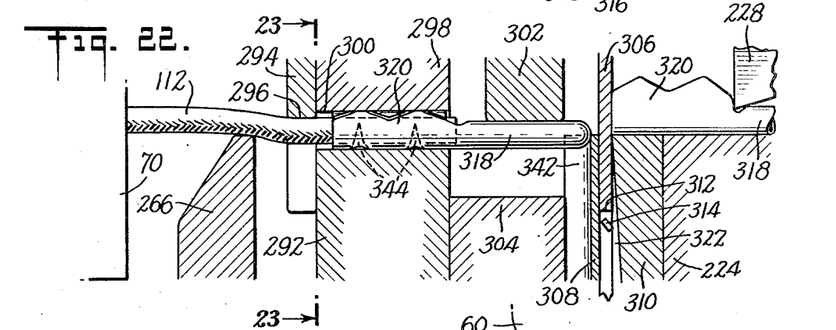
Figure 22 is a section similar to Fig. 21 but showing the parts at the end of the connector, crimping, severing and wiping operations.
Figure 23:
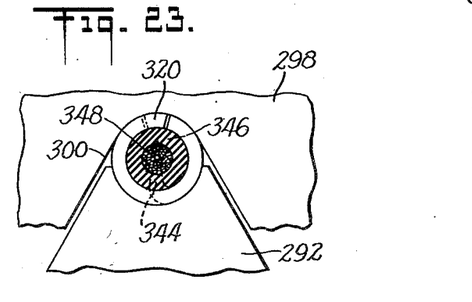
Figure 23 is a section on the line 23—23 of Fig. 22.
Figure 24:
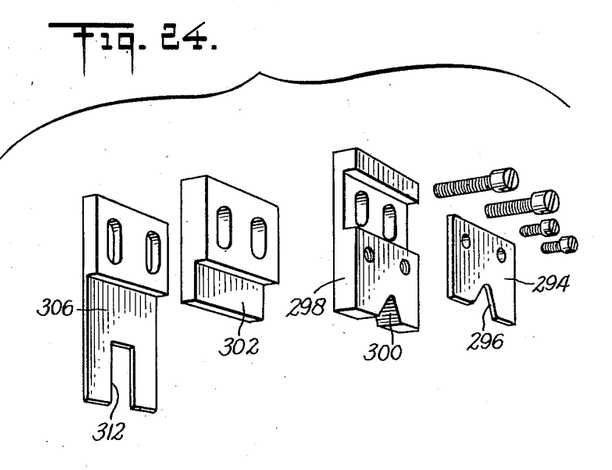
Figure 24 is an exploded view showing in perspective the upper elements of the preferred connector crimping and severing mechanism.

The locater 266 comprises a vertical slide tapered off at its upper end as shown, see Figs. 15, 19 and 22. The slide 266 is confined in a guideway in a block 268 which may be attached to the base block 8 of the machine, or to the corresponding base block 38 for the adjustable shaft bearing. A pin 270, fixed in the slide 266 and movable in a vertical slot in the block 268, has attached thereto a spring 272 attached at its upper end to a pin 274 fixed in the block 268. The spring 272 is so tensioned that it tends to keep the slide or locater 266 normally in its uppermost position. A solenoid-operated cam slide 276, see Fig. 15, operating in a guideway in the block 268, has an inclined cam end 278 engaging a cam shoulder 280 on the vertical locater slide 266. The cam slide 276 has fixed therein a pin 280 projecting through a slot 282 in the block 268. A spring 284 connected at one end to the pin 280 and at its other end to a pin 286 fixed in the block 268 tends to hold the slide 276 inoperative with the pin at the left hand end of the slot in Fig. 15.

The movable core 288 of the solenoid 290 operates, when the solenoid 290 is energized, to push the slide 276 to the right in Fig. 15, thus causing a depression of the locater slide 266 against the tension of the spring 272. The spring 272 acts to restore the locater slide 266 to its uppermost position as soon as the solenoid 290 is deenergized. The timing of the operation of the energization of the solenoid 290 is such that the locater slide 266 is temporarily depressed as the end of the lead wire is about to be moved into position over the open side of the ferrule of the connector to be crimped thereon and is deenergized in time to cause the locater, after the wire end has come over the upper end thereof, to move upward under the action of the spring 272 and lift the wire lead end above the uncrimped edge of the connector so that it can move freely into position directly above the open side of the connector. The lifting of the lead end also prevents any interference with the feeding of the connector into position on the anvil or male die 292.

When the wire lead end on each side of the carrier has thus been brought into centered relation over the open side of the connector ferrule, the crimping mechanism then operates to crimp the connectors upon the two lead ends. It will be seen that at this time the ferrule to be crimped is resting upon the slightly hollowed-out upper end of the male crimping die 292 and that the wire lead end is tilted slightly above the open side of the connector ferrule, but practically centered thereover. To insure positive centering and at the same time to insure that the lead end shall be lying within the ferrule when it is crimped, a centering device 294, having therein a tapered centering slot 296, preferably having a rounded bottom to fit snugly over the wire, is attached to the outer face of the female crimping die 298. The centering slot 296 in the centering device 294 has its rounded bottom slightly below the bottom of the crimping slot 300 in the female crimping die 298 to provide for the thickness of the ferrule itself and at the same time to insure that the engagement of the centering device with the projecting wire end will be such as to insure its proper location within the ferrule and the proper crimping of the ferrule thereupon.

Describing particularly the crimping, connector severing and wiping mechanism upon the right hand side of the machine, as viewed in Fig. 1, the crimping, connector severing and wiping mechanisms upon the two sides of the machine being substantially identical, the parts of this mechanism, as shown particularly in Figs. 15 and 21 to 25, inclusive, comprise the upper female crimping die 298, the lower anvil or male crimping die 292, the tunker plate 302, the spacer plate 304, the shear 306 and the shear plates 308 and 310. The centering device 294, the female crimping die 298, the tunker 302 and the shear 306 are connected to the crossbar or ram 22 to move therewith under the action of the cam 30 on the main shaft 12, the return movement being effected by the springs 24 and 26. The male crimping die or anvil 292, the spacer 304 and the shear plates 308 and 310 are connected to the base 8.

Figure 10:
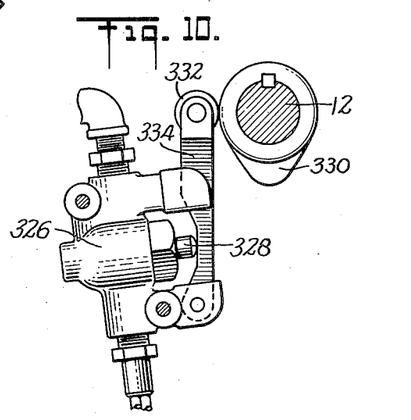
Figure 10 is a section on the line 10—10 of Fig. 1.
Figure 21:
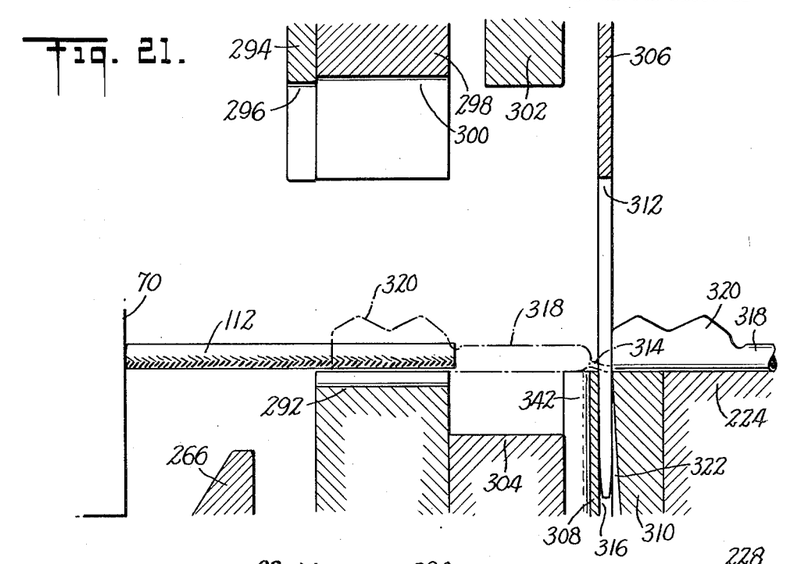
Figure 21 is a section through the preferred connector crimping and severing mechanism showing the parts in their open position.
Figure 25:
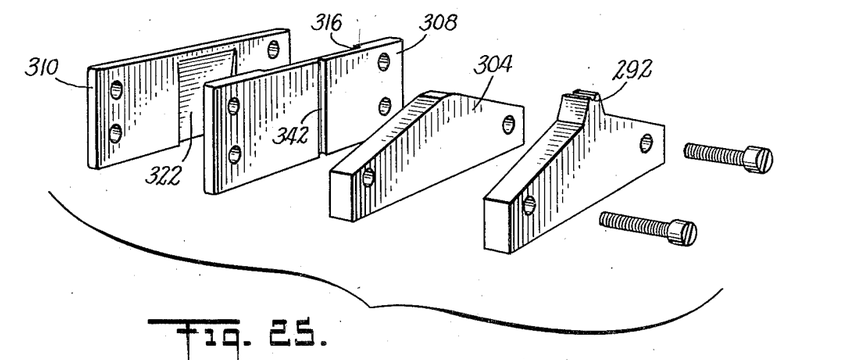
Figure 25 is a similar exploded view showing in perspective the lower or stationary elements of the connector crimping and severing mechanism.

As shown more particularly in Figs. 21 and 22, the shear 306, which has therein a slot 312 which straddles the connecting neck strip 314 on the strip of connectors, slides in a groove 316 in the rear face of the shear plate 308, as viewed in Fig. 25, and acts to shear out this connection 314 between the end of the pin part 318 of one connector and the end of the ferrule part 320 of the next connector. The other shear plate 310 is provided with a tapered recess 322 to provide discharge clearance for the sheared-out connecting strips 314. To avoid accumulation of these cut out strips in the machine, the machine may also be provided with a blow nozzle, adjacent to the discharge point, for blowing these particles away from the cutting and crimping mechanism. This nozzle may be provided with air from any suitable source of supply of compressed air controlled by a valve 326 (see Fig. 10) having a stem 328, the valve being normally pressed into seated position and being opened, at the time the connecting piece 314 is dropped into the recess 322, by means of a cam 330 on the main shaft 12 engaging a cam roller 332 on a cam lever 334 pressing against the valve stem 328.

As above suggested, the strip of connectors, which is fed into position to bring the ferrule end of the endmost connector into crimping position upon the anvil 292, is shown in the embodiment illustrated as a succession of pin type connectors connected pin to ferrule by the connecting strips 314 and the feeding is done by the pawl 228 of the connector strip feeding mechanism hereinabove described and shown particularly in Figs. 19 and 20, this pawl being maintained yieldingly in contact with the connector strip by a spring 336, connected at one end to a pin 338 on the bellcrank lever arm 232 and connected at its other end to a pin 340 extending from the end of the pawl 228 which lies beyond its pivotal connection 230 with the bellcrank lever arm 232.

When the shear 306 operates, upon the depression of the cross arm or ram 22 by the cam 30, to shear out the connecting strip 314, this shearing, being effected on a straight edge, will leave a slight burr on what should be the smooth rounded tip of the pin part 318 of the connector. To avoid any such excrescence on the pin tip, a wiping groove 342 is provided in the front face of the shear plate 308 into which the end of the pin 318 is forced by the tunker 302, as shown particularly in Fig. 22, to cause the wiping of these excrescences into the rounded end of the pin 318, thus insuring a smooth rounded end of the lead connector when it has been crimped upon the end of the lead wire. As shown in Figs. 21 and 22, the top of the spacer 304 is sufficiently below the top of the anvil 292, and also below the upper edge of the shear plate 308, to provide for this wiping movement of the end of the pin 318 after the shearing action and without bending of the pin 318 in respect to the ferrule 320.

At the same time that the shearing of the connecting strip 314 between the connector which is being crimped upon the end of the lead wire and the next connector in the strip of connectors takes place, it will be seen that the centering device 294 has come down with the female die 298, to the face of which it is connected, and has centered the end of the lead wire in the open ferrule 320 in advance of the crimping action which takes place immediately thereafter (see Figs. 21 and 22). This crimping action causes the insulation piercing points 344 which are struck up on the inner faces of the ferrules 320 to pierce the insulation 346 on the wire and effect an electrical contact with the conductor 348, see Fig. 23.

The locater 266, which is constantly urged toward its uppermost position by the spring 272 and has been lowered just prior to the bringing of the end of the lead wire over the ferrule 320 and then allowed to rise again as the wire comes into this position, will be forced downward against the action of the spring 272 as the centering device 294 presses the wire end into the ferrule 320 in position to have the ferrule crimped thereupon, see Fig. 22.

As the shaft 12 continues to rotate the cam 30 will permit the crossbar or ram 22 to rise again under the action of the springs 24 and 26, thus raising the centering device 294, the female crimping die 298, the tunker 302 and the shear 306, thereby leaving the now completed lead free to be indexed toward the lead discharge position. In the form of the invention shown in Figs. 1 to 25 inclusive the completed leads are stripped from the carrier clamps as they are brought by the carrier into lead discharge position, no other means being provided for effecting the opening of the clamps. This stripping mechanism may comprise outer and inner spring fingers 350 and 352 connected to a crossbar 354, the outer spring fingers 350 being shorter than the inner fingers 352 to avoid their interfering with the crimping and cutting mechanism.

Figures 7, 8:
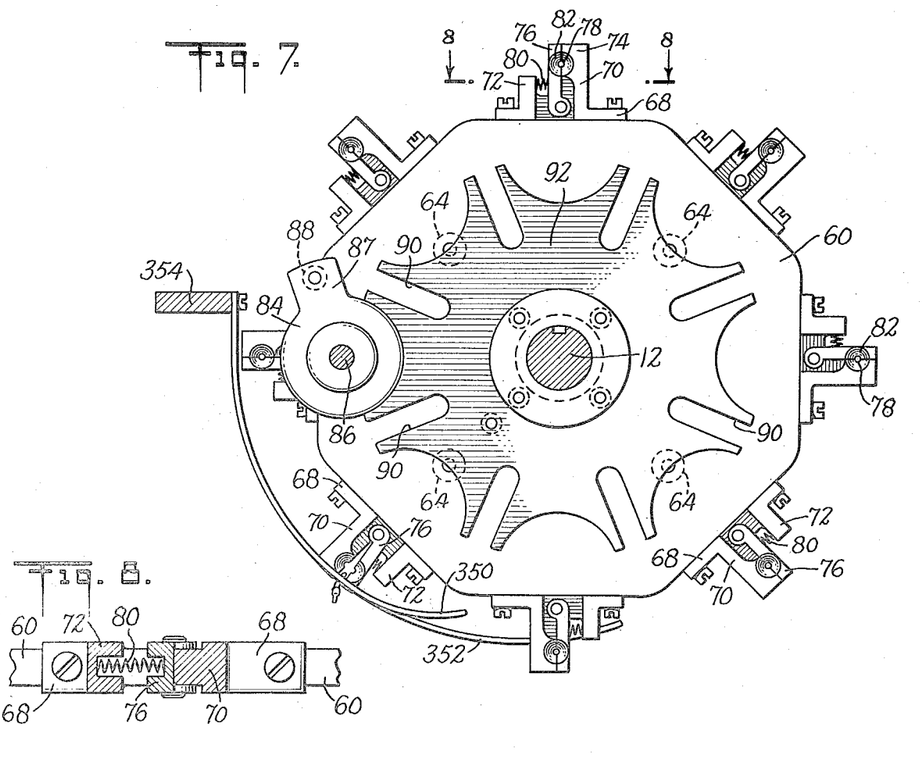
Figure 7 is a section on the line 7—7 of Fig. 1.
Figure 8 is a section on the line 8—8 of Fig. 7.
Figure 26:
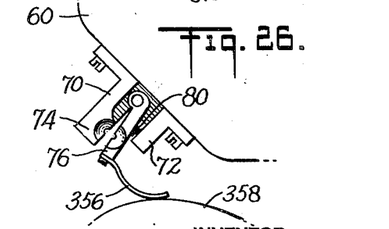
Figure 26 shows a modification of the wire gripper or clamp construction to provide for mechanical opening thereof at the point of discharge of the completed leads.

From an inspection of Fig. 7 it will be seen that, as the carrier is indexed from the crimping position to carry the lowermost clamps toward the front of the machine, the fingers 350 and 352 will engage the lead wire on the two sides of the clamp, this engagement being with that side of the lead wire which is nearest the octagonal rotary member, and that, as the clamp comes into the position shown at the left in Fig. 7, the fingers will force the lead wire to open the clamp as there shown and thus strip the wire from the clamp and carrier. There are spring fingers 350 and 352 for each side of the clamp carrier so that the lead wire is simultaneously stripped from the two clamps which are holding the lead wire that is being operated upon.

Where a lead wire is of sufficient weight to drop from an open clamp of itself the modified means for effecting the removal of the completed lead wire from the clamps, which means are shown in Fig. 26, may be used. In this form of the invention the movable jaw 76 of the wire clamp has attached thereto a leaf spring arm 356 which, when it engages a stationary cam 358 during rotation of the carrier, acts to open the clamp against the spring 80, thus permitting the completed lead to drop out of the clamp. There is, of course, a spring arm 356 for each of the pair of clamps holding a single lead.

In Figure 9, which shows the end of the shaft 12 at the left of the stationary bearing support 32, Figure 9 being a section on the line 9—9 of Figure 1, the cam for operating certain of the solenoid switches is shown. This cam 360, which is keyed to the shaft 12, in its rotation with the shaft 12 in the direction of the arrow shown in Figure 9, engages first the cam roller 362 on the switch operating arm 364 that controls the switch 366 closing the circuit through the cutter operating solenoids 166 and 184 and the wire guide gate-opening solenoid 220. As the cam 360 continues to rotate it engages the cam roll 368 on the switch arm 370 that controls the switch 372 for energizing the solenoid 290 which effects the depression of the locater 266.

From the foregoing description it will be seen that novel but simple and effective means have been provided for making leads having connectors of any desired type crimped upon the ends thereof and that the machine is adapted for producing such completed leads in a wide range of lengths. In adapting the machine for use in the production of leads of different lengths it will be seen that the major part of the adaptation is effected merely by adjusting the base 38, together with the parts mounted thereon, along the lathe bed 9 to space the wire clamps on the octagonal rotary members 60 and 62 the desired distance apart to hold, for the connector applying operation, a lead of the desired length. Certain substitutions of connecting parts have to be made, however. First, the spacer rods 64 have to be replaced by rods suitable to the new spacing of the rotary members 60 and 62; secondly, the guide which guides the lead wire, as it is being fed between the clamp on the right hand rotary member 60 and the corresponding clamp on the left hand rotary member 62 in Figure 1, must be replaced by one suitable to the new spacing of these two rotary members, that is, so far as the actual wire guiding parts of the clamp are concerned. The remainder of the operating mechanism, such as the solenoid operated guide opening device, etc., can remain the same.

The feeding of the proper length of wire for the new adjustment can be provided for by the simple means for adjusting the wire feed hereinabove described and which includes the lead screw 146 in the crank arm 130 by which the amount of throw of the rack bar 128 may be varied.

In wire feeding mechanism of the type employed with this machine, which has a considerable length of feed movement that must take place in not more than a half rotation of the main shaft 12, difficulty is sometimes experienced in overcoming the inertia of the connections back to the wire coil, with the result that considerable load is placed upon the gripping parts of the wire feed, that is, upon the feeding wheel 104 and the presser wheel 106. To insure more gradual action of the feed it is sometimes desirable to place between the feeding roll 104 and the wire reel or coil from which the lead wire is supplied means for effecting a gradual transfer of the pull from the feeding mechanism to the coil. This may be done by simply causing the wire to be looped about a pulley having a spring connection to its support such that a sudden pull on the wire first stretches the spring and thus provides the needed slack in the wire for the feed, the spring gradually transferring the pull to the coil after the feeding has been effected.

What is claimed as new is:

1. A machine for cutting lengths of wire and applying electrical connectors to the ends thereof which comprises, a frame portion, means constituting a supply of wire, a pair of spaced connector applying mechanisms mounted in a first operating zone on said frame, means for feeding connectors to said connector applying mechanisms, a wire feeding and cutting mechanism mounted in a second operating zone on said frame, said wire feeding and cutting mechanism being adapted to cut off lengths of wire substantially equal to the distance between said spaced connector applying mechanisms, and movable wire carrier means for engaging said lengths of wire in said second operating zone and positioning them one at a time in said first operating zone, so that each end is placed within one of said connector applying mechanisms whereby connectors are applied to both ends of the lengths of wire upon actuation of said mechanisms.

2. A machine according to claim 1 in which the carrier means is provided with clamps so spaced that each grips the wire adjacent to the end thereof but leaving a projecting portion for insertion in the connectors.

3. A machine according to claim 1 in which the means for feeding the connector into crimping position and the means for effecting the crimping thereof on one end of the lead are mounted for adjustment bodily toward and away from the connector feeding means and the crimping means for the other lead end, and in which the means for feeding the lead wire into the carrier is adjustable to feed different lengths, whereby the machine may be adapted to apply connectors to leads of various lengths.

4. A machine according to claim 3 in which clamping means for gripping the wire lead near the projecting ends thereof are mounted on the carrier and in which provision is made for adjusting these clamps to different spacings to adapt them for gripping leads of different lengths adjacent to the connector receiving ends thereof.

5. A machine according to claim 1 in which the lead wire feeding means is set to overfeed slightly and cutting means are arranged to operate upon both sides of the carrier to insure projecting ends of the desired extents.

6. A machine according to claim 1 in which the carrier comprises axially spaced rotary members having peripherally mounted spring clamps with aligned wire receiving openings, said carrier being movable about its axis between wire receiving and connector applying positions and a wire guide being arranged to guide the fed-in lead wire between the aligned clamp openings in the wire receiving position, means being also provided for opening said guide to release the wire for movement with the carrier into connector applying position.

7. A machine for cutting lengths of wire and applying connectors to the ends thereof which comprises, a pair of spaced connector applying mechanisms, a supply of connectors adapted to be fed thereto, a wire feeding and cutting mechanism for cutting from a substantially endless supply lengths of wire greater in length than the spaced distance of said connector applying mechanisms, a wire carrier mechanism having a pair of wire engaging members spaced apart a distance less than said connector applying mechanisms, and adapted to engage said lengths of wire adjacent each end thereof to accurately position said ends in a connector fed to said connector applying mechanisms, means for crimping said connectors about said inserted wire ends, and means for discharging said wire and connector assemblies from said wire carrier.

8. A machine according to claim 7 provided with means operating to lift the connector receiving end of the wire above said connectors as said wire moves into connector applying position and means operable during the crimping operation for centering said wire end over the connector ferrule and of moving it into said ferrule prior to the crimping of the ferrule.

9. A machine according to claim 1 in which means are provided for lifting the projecting ends of the lead above the ferrules as the carrier brings said ends into connector applying position.

10. A machine according to claim 1 in which the carrier is provided with spring clamps so spaced that each grips the lead adjacent to the projecting end thereof, said clamps having aligned wire receiving openings and means located in the lead receiving position of the carrier for guiding the wire as it is fed between the said clamps, said means having provision for opening to release the wire for movement with the carrier after it has been fed into position in said clamps.

11. A machine according to claim 10 in which means are provided for automatically opening the wire guide preparatory to the movement of the carrier to carry the lead from lead-receiving position into connector applying position.

12. A machine according to claim 10 in which that end of the wire receiving opening in each wire clamp into which the feed wire first enters is provided with a tapered wire directing enlargement to facilitate the direction of the wire in the wire-receiving opening.

13. A machine according to claim 1 in which the carrier is provided with spring clamps comprising relatively movable spring jaws, said clamps being so spaced that each grips the lead adjacent to the projecting end thereof, and stripping fingers being arranged to engage each lead upon each side of each clamp, after the connectors have been applied, in order to force the leads out of the clamps.

14. A machine according to claim 1 in which the carrier comprises axially spaced, rotary, like polygonal members having parallel sides and having wire clamps upon their polygonal sides, the axial spacing of said members being adjustable to suit the device to leads of various lengths.

References Cited in the file of this patent

UNITED STATES PATENTS

| Number | Name | Date |
|---|---|---|
| 1,706,005 | Thompson | Mar. 19, 1929 |
| 1,850,126 | Bruckner | Mar. 22, 1932 |
| 2,034,560 | Bumstead | Mar. 17, 1936 |
| 2,137,181 | Quackenbush | Nov. 15, 1938 |
| 2,268,659 | Hubbard | Jan. 6, 1942 |
| 2,340,448 | Andren | Feb. 1, 1944 |
| 2,376,335 | Braendel | May 22, 1945 |
| 2,545,756 | Andren | Mar. 20, 1951 |